United States Patent
Brown et al.

(10) Patent No.: US 9,352,775 B2
(45) Date of Patent: May 31, 2016

(54) METHOD FOR DETERMINING ASSIST TORQUE OFFSET AND SYSTEM USING SAME

(75) Inventors: Andrew Brown, Canton, MI (US); Darrel Alan Recker, Ypsilanti, MI (US)

(73) Assignee: Ford Global Technologies, Dearborn, MI (US)

( * ) Notice: Subject to any disclaimer, the term of this patent is extended or adjusted under 35 U.S.C. 154(b) by 878 days.

(21) Appl. No.: 13/537,214

(22) Filed: Jun. 29, 2012

(65) Prior Publication Data

US 2014/0005891 A1    Jan. 2, 2014

(51) Int. Cl.
| | |
|---|---|
| G06F 17/00 | (2006.01) |
| G06F 19/00 | (2011.01) |
| B62D 6/00 | (2006.01) |
| B62D 15/02 | (2006.01) |
| B62D 5/00 | (2006.01) |
| B62D 5/04 | (2006.01) |

(52) U.S. Cl.
CPC .............. *B62D 6/008* (2013.01); *B62D 15/027* (2013.01); *B62D 5/008* (2013.01); *B62D 5/0463* (2013.01)

(58) Field of Classification Search
USPC ................ 701/41–42; 180/443, 446; 318/434
See application file for complete search history.

(56) References Cited

U.S. PATENT DOCUMENTS

| | | | | |
|---|---|---|---|---|
| 5,341,891 A * | 8/1994 | Wada | ................... | B62D 5/0478 180/445 |
| 6,370,459 B1 * | 4/2002 | Phillips | ................ | B62D 5/0436 180/443 |
| 6,671,597 B2 * | 12/2003 | Kada | ............................... | 701/41 |
| 7,203,582 B2 * | 4/2007 | Yokota | ................... | B62D 5/046 180/443 |
| 7,540,351 B2 | 6/2009 | Kataoka | | |

(Continued)

FOREIGN PATENT DOCUMENTS

| | | |
|---|---|---|
| EP | 2251244 A2 | 11/2010 |
| JP | 2008221869 A | 9/2008 |

(Continued)

OTHER PUBLICATIONS

A Robust Controller Design for Electric Power Steering System Based on PI Current Loop; Qiang Li ; De-yu Song ; Feng Cheng ; Li-kang Yang ; Ren-hua Cai; Measuring Technology and Mechatronics Automation, 2009. ICMTMA'09. International Conference on; vol. 1; DOI: 10.1109/ICMTMA.2009.184; Publication Year: 2009 , pp. 753-756.*

(Continued)

*Primary Examiner* — Cuong H Nguyen
(74) *Attorney, Agent, or Firm* — Angela M. Brunetti; Raymond Coppiellie

(57) ABSTRACT

A vehicle having a driving assist system and an electric power assist steering system coupled to the driving assist system. The driving assist system transmits an assist torque request for reception by the electric power assist steering system for enabling the electric power assist steering system to adjust its outputted assist torque to accommodate requirements of the driving assist system. The assist torque request specifies a requested additional assist torque required by the driving assist system from the electric power assist steering system. In response to receiving the assist torque request, the electric power assist steering system performs an operation for determining a column torque offset as a function of both a force being applied by a driver of the vehicle on a steering column of the vehicle and the requested additional assist torque required by the driving assist system.

3 Claims, 3 Drawing Sheets

(56) References Cited

U.S. PATENT DOCUMENTS

| | | | |
|---|---|---|---|
| 8,670,904 B2 * | 3/2014 | Yoneda | B62D 5/046 180/404 |
| 8,977,433 B2 * | 3/2015 | Kojima | 701/41 |
| 2004/0148080 A1 * | 7/2004 | Ekmark | B62D 6/008 701/41 |
| 2005/0236223 A1 * | 10/2005 | Yokota | B62D 5/046 180/446 |
| 2006/0069481 A1 * | 3/2006 | Kubota | B62D 5/0463 701/41 |
| 2008/0308342 A1 | 12/2008 | Nishimori | |
| 2010/0211264 A1 | 8/2010 | Wey | |
| 2010/0268422 A1 | 10/2010 | Blommer | |
| 2011/0010054 A1 | 1/2011 | Wilson-Jones | |
| 2011/0035114 A1 * | 2/2011 | Yoneda | B62D 5/046 701/42 |

FOREIGN PATENT DOCUMENTS

| | | | | |
|---|---|---|---|---|
| WO | WO2004/078560 | * | 9/2004 | B62D 5/046 |
| WO | WO2009/145270 | * | 12/2009 | B62D 5/046 |

OTHER PUBLICATIONS

Optimal control of electric power-assisted steering system; Xiang Chen ; Xiaoqun Chen ; Kemin Zhou; Control Applications, 2005. CCA 2005. Proceedings of 2005 IEEE Conference on; DOI: 10.1109/CCA.2005.1507328; Publication Year: 2005 , pp. 1403-1408.*

Robust control of electric power-assisted steering system; Chen, X. ; Chen, X. ; Li, K.; Vehicle Power and Propulsion, 2005 IEEE Conference; DOI: 10.1109/VPPC.2005.1554539; Publication Year: 2005 , pp. 473-478.*

A study on yow rate control of hydraulic-power-steering heavy duty vehicles; Bingzhao Gao ; Sanada, K. ; Furihata, K.; SICE, 2007 Annual Conference; DOI: 10.1109/SICE.2007.4421478; Publication Year: 2007 , pp. 2866-2870.*

Fault tolerant control of electric power steering using robust filter-simulation study; S. Cholakkal; X. Chen; Vehicle Power and Propulsion Conference, 2009. VPPC '09. IEEE; Year: 2009; pp. 1244-1249, DOI: 10.1109/VPPC.2009.5289706.*

Fault tolerant control of electric power steering using H-infinity filter-simulation study; S. Cholakkal; X. Chen ; Industrial Electronics, 2009. IECON '09. 35th Annual Conference of IEEE; Year: 2009; pp. 1549-1554, DOI: 10.1109/IECON.2009.5414738.*

A New Control Framework of Electric Power Steering System Based on Admittance Control; T. Yang; IEEE Transactions on Control Systems Technology; Year: 2015, vol. 23, Issue: 2; pp. 762-769, DOI: 10.1109/TCST.2014.2325892.*

Fault tolerant Control of electric power steering using Kalman filter-simulation study; S. Cholakkal; X. Chen; Electro/Information Technology, 2009. eit '09. IEEE International Conference on; Year: 2009; pp. 128-133, DOI: 10.1109/EIT.2009.5189596.*

Chen, J.S.; Control of Electric Power Steering Systems;; Feb. 1, 1998; Society of Automotive Engineers, Inc.; Warrendale, Pennsylvania, USA.

* cited by examiner

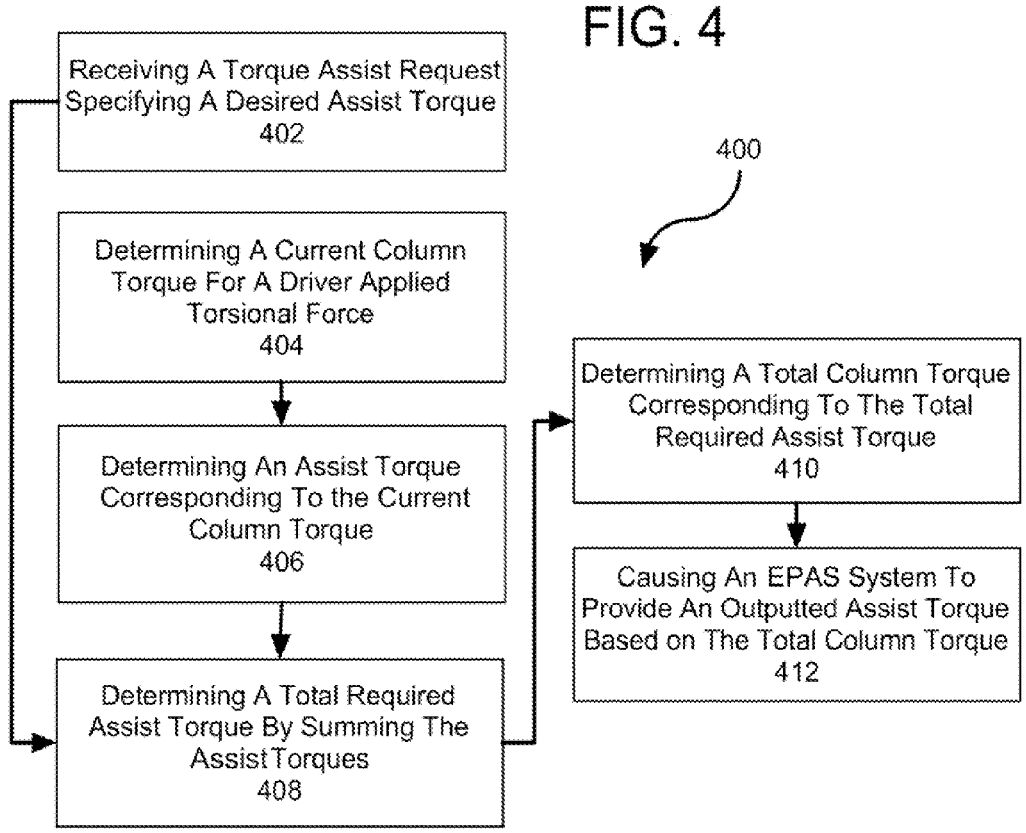
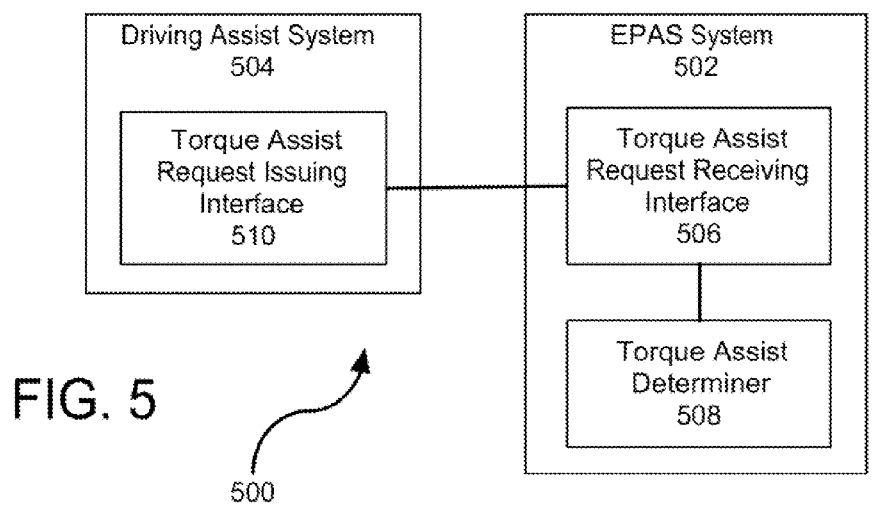

METHOD FOR DETERMINING ASSIST TORQUE OFFSET AND SYSTEM USING SAME

FIELD OF THE DISCLOSURE

The disclosures made herein relate generally to vehicle power steering systems and, more particularly, to deriving offset column torque of an electric power assist steering system as a function of output force thereof.

BACKGROUND

Some driving assist functionalities that rely upon an electric power assist steering (EPAS) system of the vehicle are designed to have their outputs cause an additional force to be injected by the EPAS system on the steering rack thereof. Examples of such driving assist functionalities include but are not limited to lane assist, torque steer compensation, and driver steer recommendation. Such functionalities can also have a need for their outputs to be limited for worst-case safety needs. For example, an amount of the additional force can be limited dependent upon factors associated with such safety needs.

However, it is known that a limit on the rack output force can make a less than desirable signal to establish safety limits because such limits often have a considerable dependence on driving conditions. For example, in some instances, a rack output force (i.e., outputted assist torque) that is acceptable in curves may not be acceptable in straight driving. A known approach for mitigating this situation of a less than desirable signal is to transform a desired rack force output to a desired driver handwheel torque output. One example of performing such a transformation entails 1.) computing or acquiring a desired rack force injection, 2.) transforming the desired rack force injection to a corresponding handwheel torque injection based upon driving conditions, 3.) summing the corresponding handwheel torque injection with other injection features if there are more than one, and 4.) limiting the resulting value of such summing to worst case safe thresholds (limits in rate, magnitude, etc.). The result of this transformation is handwheel torque offset. This transformation approach inherently adapts to the driving conditions such that the limits on the desired driver handwheel torque output correlate more desirably to worst-case safety limits (e.g., driver-perceived worst case safety limits). Dual torque injection is a known control technique that can be implemented for allowing the driver handwheel torque injection corresponding to the driver handwheel torque offset to be realized as a rack force output that a particular EPAS feature desires.

One shortcoming of the abovementioned approach for mitigating the situation of the rack output force making for a less than desirable EPAS injection signal is that known techniques for transforming the desired rack force injection to the corresponding handwheel torque offset (i.e., step 4 above) are imprecise thereby creating a noticeable difference between the desired rack force injection (i.e., step 1 above) and what will be implemented for rack force as a result of implementing the corresponding dual torque injection for handwheel torque offset. Therefore, a solution that overcomes this shortcoming would be advantageous, desirable and useful.

SUMMARY OF THE DISCLOSURE

Embodiments of the inventive subject matter are directed to determining a preferred (e.g., safety limit optimized) handwheel torque offset as a function of an output of an electric power assist (EPAS) system of a vehicle. More specifically, embodiments of the inventive subject matter provide for transforming the desired rack force injection to a corresponding handwheel torque injection based upon driving conditions. In this regard, the corresponding handwheel torque injection more accurately reflects the driving condition and, thus, driving assist functionalities having an output that causes an additional force to be injected on the steering rack achieve more consistent performance due to the increased precision and accuracy of these transformations.

In one embodiment of the inventive subject matter, a method is provided for determining information used in operating an electric power assist steering system of a vehicle. The method includes an operation for determining a first column torque as a function of a requested additional assist torque required by a driving assist system that influences outputted assist torque of the electric power assist steering system and for determining a second column torque resulting from torsional force being applied by a driver of the vehicle on a steering column of the vehicle. Thereafter, an operation is performed for determining a column torque offset as a function of both the first column torque and the second column torque.

In another embodiment of the inventive subject matter, a vehicle having a driving assist system and an electric power assist steering system coupled to the driving assist system. The driving assist system transmits an assist torque request for reception by the electric power assist steering system for enabling the electric power assist steering system to adjust its outputted assist torque to accommodate requirements of the driving assist system. The assist torque request specifies a requested additional assist torque required by the driving assist system from the electric power assist steering system. In response to receiving the assist torque request, the electric power assist steering system performs an operation for determining a column torque offset as a function of both a force being applied by a driver of the vehicle on a steering column of the vehicle and the requested additional assist torque required by the driving assist system.

In another embodiment of the inventive subject matter, an electronic control system has a set of instructions tangibly embodied on a non-transitory processor-readable medium thereof. The set of instructions are accessible from the non-transitory processor-readable medium by at least one data processing device of the electronic controller system for being interpreted thereby. The set of instructions is configured for causing the at least one data processing device to carry out operations for determining a first column torque as a function of a requested additional assist torque required by driving assist system that influences outputted assist torque of an electric power assist steering system of a vehicle, determining a second column torque as a function of torsional force being applied by a driver of the vehicle on a steering column of the vehicle, determining a column torque offset as a function of both the first column torque and the second column torque.

These and other objects, embodiments, advantages and/or distinctions of the inventive subject matter will become readily apparent upon further review of the following specification, associated drawings and appended claims.

BRIEF DESCRIPTION OF THE DRAWINGS

FIG. 4 is a flow chart showing a method configured for providing assist torque offset functionality in accordance with an embodiment of the inventive subject matter.

FIG. 5 is a block diagram showing a vehicle configured for providing assist torque offset functionality in accordance with an embodiment of the inventive subject matter.

DETAILED DESCRIPTION OF THE DRAWING FIGURES

For certain driving assist functionalities of a vehicle such as lane assist, for example, it can be necessary to develop a computational concept that takes the output force of the EPAS system and converts it into an offset column torque. The graphical representation of this numerical conversion is referred to herein as an inverse boost curve, which is inverted with respect to a standard boost curve. In the normal boost curve graph 100 shown in FIG. 1, the amount of steering assistance provided by the EPAS system is a function of the low frequency driver torque. Frequency of driver-applied torque can be measured/monitored using a torque sensor. In the context of the inventive subject matter, low frequency preferably refers to frequencies typically below about 10 Hz. Furthermore, in the context of the inventive subject matter, handwheel torque such as measured by the torque sensor is also referred to herein as column torque as the column torque is reactionary and thus quantitatively the same as the handwheel torque.

Figure 1:
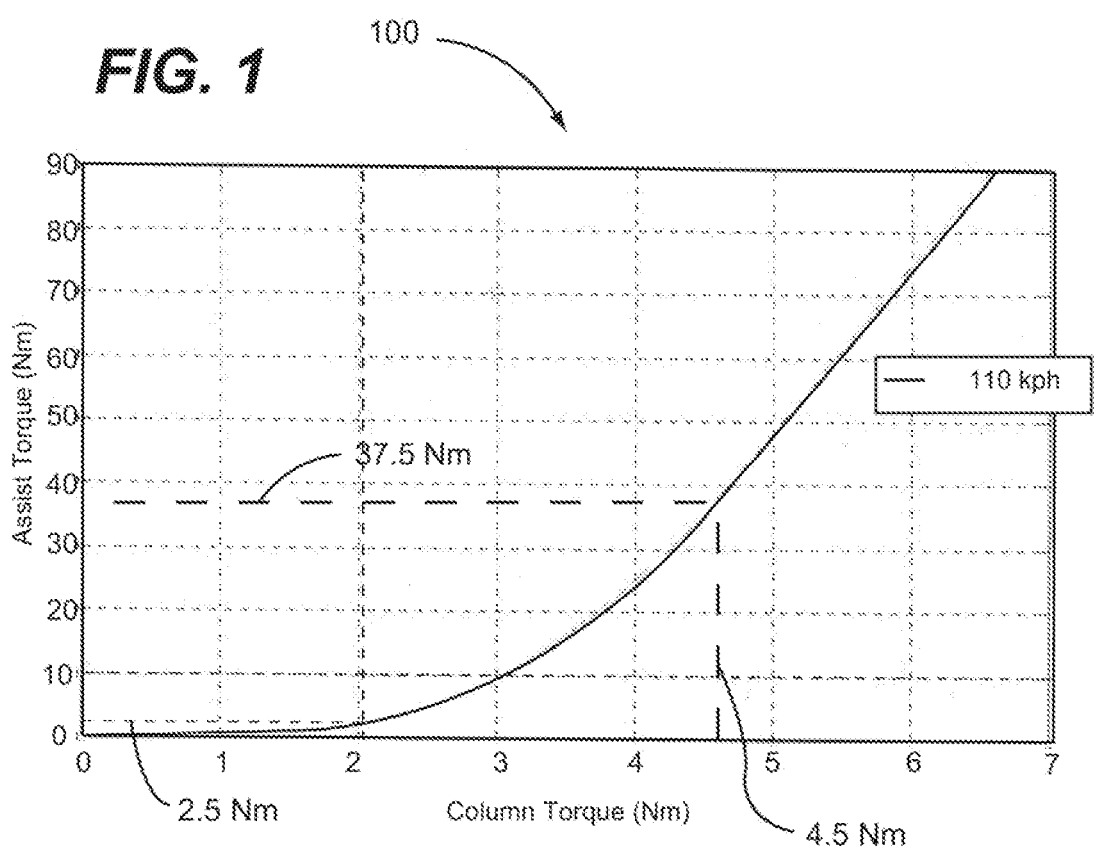
FIG. 1 is a graph showing a normal boost curve for an electric power assist steering system of a vehicle.
Figure 2:
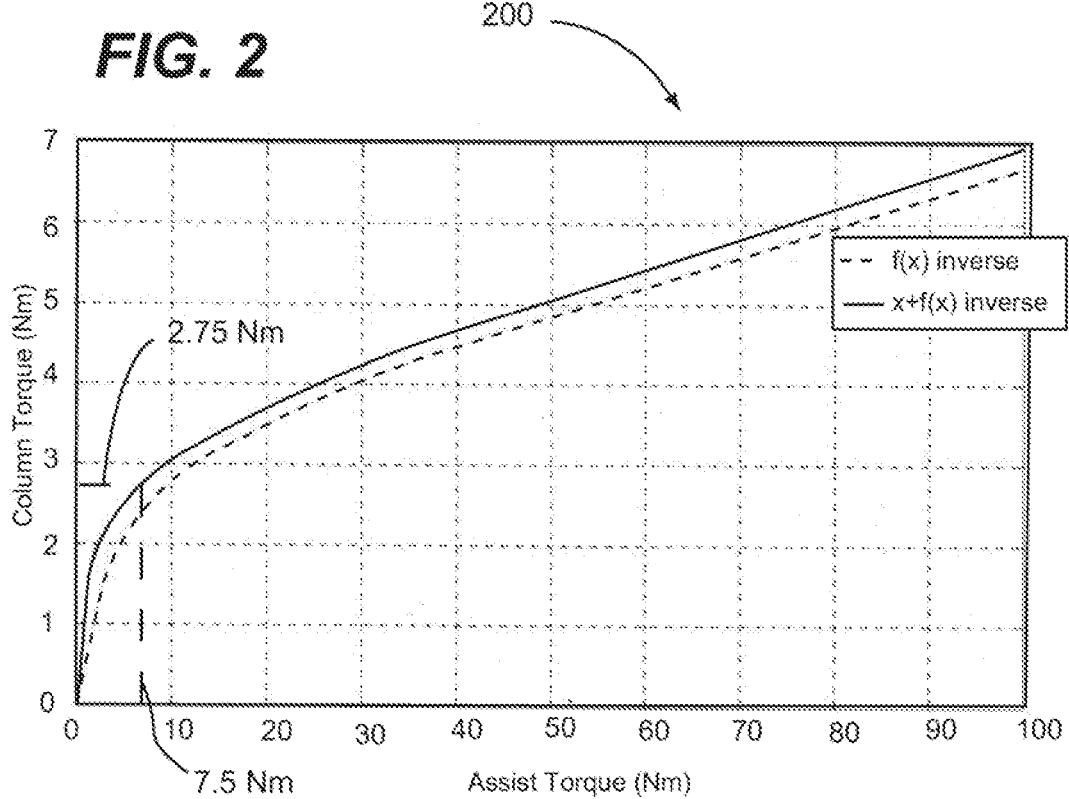
FIG. 2 is a graph showing an inverse boost curve in accordance with an embodiment of the inventive subject matter.

As shown in the normal boost curve graph 100 of FIG. 1, assist torque is a function of column torque. When inverted, as shown in the inverse boost curve graph 200 of FIG. 2, column torque is a function of assist torque. The inverse boost curve graph 200 can have the same number of speed-based inverse boost curves as the normal assist curve graph 100 has speed-based normal boost curves. For simplicity, the normal boost curve graph 100 and the inverse boost curve graph 200 are each shown with only one respective speed-based curve. Furthermore, as shown, inverse boost curves of the inverse boost curve graph 200 shall approximate the functional shape of normal boost curves of the normal boost curve graph 100. The inverse boost curve shown in FIG. 2 is an embodiment of an inverse assist torque data structure. Furthermore, the data represented by the inverse boost curve can be provided in other suitable data structure formats such as, for example, tabular format (i.e., an inverse assist torque look-up table).

The equation (i.e., equation 1) for the curve shown in the normal assist curve graph 100 can be described as follows:

$AssistTq_i = f(HdwhlTq_i)$, where AssistTq is assist torque provided as outputted torsional force (i.e., torque) from the EPAS system and HdwhlTq is handwheel torque from the torque sensor.

And the total force balance equation (i.e., equation 2) can be described as follows:

$TqRackLoad_i = HdwhlTq_i + AssistTq_i$, where TqRackLoad is total force output including both assist and driver applied input force at the steering column.

Replacing equation (1) into (2) yields:

$TqRackLoad_i = HdwhlTq_i + f(Hdwhltq_i)$.

With the concept of $g(x) = x + f(x)$, equation 4 is as follows:

$TqRackLoad_i = g(HdwhlTq_i)$.

The curve of the inverse boost curve graph 200 that is designated as x+f(x) inverse is the correct inverse function. This correct inverse refers to a straight inversion of the normal boost curve shown in the normal boost curve graph 100 of FIG. 1 with the handwheel torque (x) added in as described in equation 3 and 4. The equation for this inverse function (i.e., equation 5) can be described as follows:

$Hdwhltq_i = g^{-1}(TqRackload_i)$.

If a rackforce offset (i.e., also referred to herein as assist torque offset (i.e., AssistTqOffset)) is desired to be achieved through a handwheel torque offset (i.e., HdwhlTqOffset) value (in order to apply a limitation), it can be described through the following equation (i.e., equation 6):

$TotalHdwhlTq_i = g^{-1}(TqRackload_i + AssistTqOffset_i)$,
where $TotalHdwhlTq = HdwhlTq + HdWhlTqOffset$ (i.e., equation 7).

Accordingly, if the desired HdwhlTqOffset is solved using equations (5), (6), and (7), the result is the following equation (i.e., equation 8) that describes the HdwhlTqOffset in regard to assist torque offset functionality in accordance with the inventive subject matter:

$HdwhlTqOffset_i = g^{-1}(TqRackload_i + AssistTqOffset_i) - g^{-1}(TqRackload_i)$.

The values of equation 8 cannot be combined farther because of the non-linear behavior of the inverse boost curve function.

Figure 3:
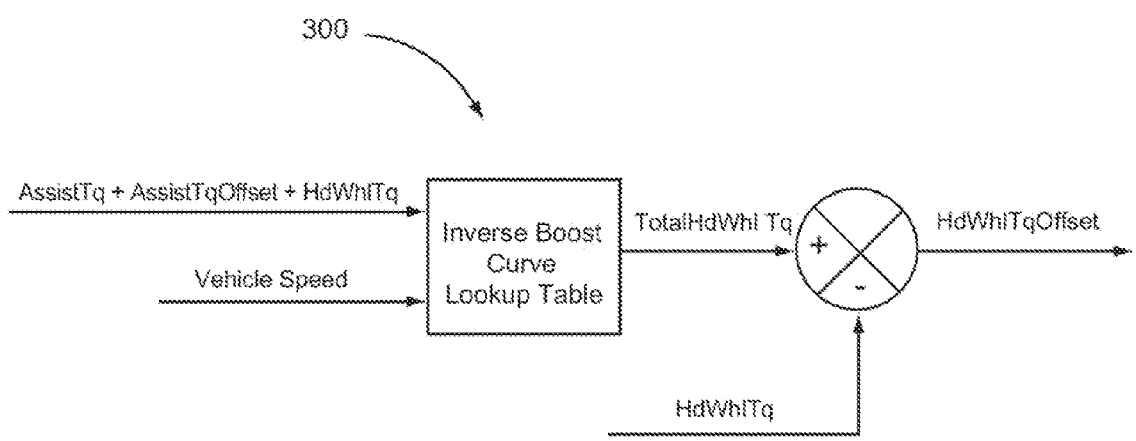
FIG. 3 is a diagrammatic view showing a control system for providing assist torque offset functionality in accordance with an embodiment of the inventive subject matter.

Turning now to FIG. 3, an implementation of a control system 300 for providing assist torque offset functionality in accordance with an embodiment of the inventive subject matter is discussed. In such implementation of the control system 300, it can be assumed that a previously recorded value for an assist force (torque) instance can be used. This assumes a low frequency assistance force is being provided and that, for a small time duration, this force can be assumed to change very little. Also, equation (8) can be simplified by substituting the equations (2) and (5) with using the measured handwheel torque of the EPAS controller. With these assumptions, the following equation (i.e., equation 9) is obtained and is represented by the control system shown in FIG. 3:

$HdWhlTqOffset_i = g^{-1}(HdwhlTq_{i-1} + AssistTq_{i-1} + AssistTqOffset_i) - HdWhlTq_{i-1}$.

Referring now to FIG. 4, an embodiment of a method 400 configured for providing assist torque offset functionality in accordance with an embodiment of the inventive subject matter is discussed. The method 400 includes an operation 402 for receiving a torque assist request (TAR). The TAR specifies a requested additional assist torque and is issued by a driving assist feature of a vehicle. For example, a lane assist driving functionality can issue a TAR specifying that the EPAS system of the vehicle provide an additional 5 Nm assist torque at the current vehicle speed of 110 kph. The objective of the TAR is for the EPAS system to provide the requested amount of assist torque in addition to any other amount of assist torque that needs to be provided by the EPAS system for other purposes and/or functionalities of the vehicle.

In conjunction with receiving the TAR (e.g., in response to receiving the TAR, shortly before/after receiving the TAR, etc), an operation 404 is performed for determining a current column torque corresponding to a driver applied torsional force (i.e., the current low frequency handwheel torque) followed by an operation 406 for determining an assist torque corresponding to the current handwheel torque. For example, using the inverse boost curve graph 200, a 2.0 Nm handwheel torque at the current vehicle speed of 110 kph corresponds to a 2.5 Nm assist torque. As disclosed above, in the context of the inventive subject matter, low frequency preferably refers to frequencies typically below about 10 Hertz.

Next, an operation 408 is performed for determining a total required assist torque. The total required assist torque is the sum of the current low frequency handwheel torque and the requested additional assist torque. Accordingly, for the requested additional assist torque of 5 Nm from the TAR and the 2.5 Nm assist torque corresponding to the current low frequency handwheel torque, the total required assist torque is 7.5 Nm.

After determining the total required assist torque, an operation 410 is performed for determining a total column torque corresponding to the total required assist torque. For example, using the inverse boost curve graph 200, a total required assist torque of 7.5 Nm at the current vehicle speed of 110 kph corresponds to a 2.75 Nm total column torque. As can be seen, when the current handwheel torque of 2.0 Nm is accounted, the column torque offset that corresponds to the requested additional assist torque is 0.75 Nm in order to achieve the additional 5 Nm of low freq assist torque offset specified in the TAR. Thereafter, an operation 412 is performed for causing the EPAS system to provide an outputted assist torque based on the total column torque of 2.75 Nm, thus resulting in the EPAS system outputting 7.5 Nm of assist torque as derived from the normal boost curve graph 100.

It is important to note that if the functionality of the inventive subject matter is not implemented, the current value of the column torque from the driver applied handwheel torque will not be accounted for. In this manner, the requested additional assist torque of 5 Nm would correspond to a column torque of 2.5 Nm. When combined with the 2.0 Nm handwheel torque, the resulting total column torque of 4.5 Nm would result in an assist torque of 37.5 Nm, as can be seen in the normal boost curve graph 100 of FIG. 1. As such, an assist torque of 35 Nm (i.e., 37.5 Nm total assist torque less 2.5 Nm of driver applied handwheel torque) is much more than the desired 5 Nm of assist torque specified in the TAR.

Referring now to instructions processible by a data processing device, it will be understood from the disclosures made herein that methods, processes and/or operations adapted for carrying out assist torque offset functionality as disclosed herein are tangibly embodied by computer readable medium having instructions thereon that are configured for carrying out such functionality. In one specific embodiment, the instructions are tangibly embodied for carrying out the method 400 disclosed above. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the inventive subject matter include a compact disk, a hard drive, RAM or other type of storage apparatus that has imaged thereon a computer program (i.e., instructions) adapted for carrying out assist torque offset functionality in accordance with an embodiment of the inventive subject matter.

As shown in FIG. 5, a vehicle 500 has an EPAS system 502 and a driving assist system 504. The EPAS system 502 includes a torque assist request receiving interface 506 and a torque assist determiner 508. The driving assist system 504 includes a torque assist request issuing interface 510 through which torque assist requests are transmitted for reception by the EPAS system. To this end, the torque assist request receiving interface 506 is coupled to the torque assist request issuing interface 510. The torque assist determiner 508 is configured for carrying out assist torque offset functionality in accordance with an embodiment of the inventive subject matter. In one embodiment, the torque assist determiner 508 is configured for providing the functionality of the control system 300 discussed above in reference to FIG. 3. In another embodiment, the torque assist determiner 508 is configured for carrying out the method 400 disclosed above in reference to FIG. 4.

In the preceding detailed description, reference has been made to the accompanying drawings that form a part hereof, and in which are shown by way of illustration specific embodiments in which the inventive subject matter may be practiced. These embodiments, and certain variants thereof, have been described in sufficient detail to enable those skilled in the art to practice embodiments of the inventive subject matter. It is to be understood that other suitable embodiments may be utilized and that logical, mechanical, chemical and electrical changes may be made without departing from die spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for determining information used in operating an electric power assist steering system of a vehicle having a set of instructions tangibly embodied on a non-transitory processor-readable medium by at least one data processing device, comprising:
   receiving a torque assist request defined by additional assist torque required by a driving assist system;
   determining a current column torque defined by a torsional force being applied by a driver on the steering column of the vehicle;
   determining an assist torque corresponding to the current column torque using an inverse assist torque data structure and a vehicle speed;
   determining a total required assist torque as a sum of the current column torque and the requested additional torque;
   determining a total column torque corresponding to the total required assist torque using the inverse assist torque data structure
   determining a column torque offset as a difference between the first column torque and the second column torque
   causing the electric power assist steering system to provide an outputted assisted torque derived from a normal assist torque data structure based on the total column torque and a vehicle speed.

2. A system for operating a steering assist system on a vehicle, comprising:
   a driving assist system;
   an electric power assist steering system coupled to the driving assist system, the electric power assist steering system having a torque assist determiner configured to implement an assist torque offset functionality;
   the torque assist determiner receives a first column torque from the driving assist system, the first column torque is representative of a requested additional assist torque required by the driving assist system;
   the torque assist determiner determines a second column torque from the electric power assist system, the second column torque is representative of a force being applied by a driver on a steering column of the vehicle;

the torque assist determiner determines an assist torque that corresponds to the second column torque using an inverse boost curve graph;

the torque assist determiner defines a total required assist torque that is the sum of the first and second column torques;

the torque assist determiner defines a total column torque corresponding to the total required assist torque using the inverse boost curve graph; and a signal representative of a column torque offset;

the torque assist determiner causes the electric power steering system to provide an outputted assist torque to the driving assist system based on the total column torque as derived from a normal assist torque data structure.

3. The method of claim 1 wherein the torsional force is applied at a frequency below about 10 Hz.

* * * * *